# 3,006,244
OPTICAL TELESCOPE MOUNT
William B. Farrington, Upper Montclair, N.J., assignor to Farrington Engineering Corporation, Upper Montclair, N.J., a corporation of Delaware
Filed Sept. 6, 1960, Ser. No. 54,127
9 Claims. (Cl. 88—32)

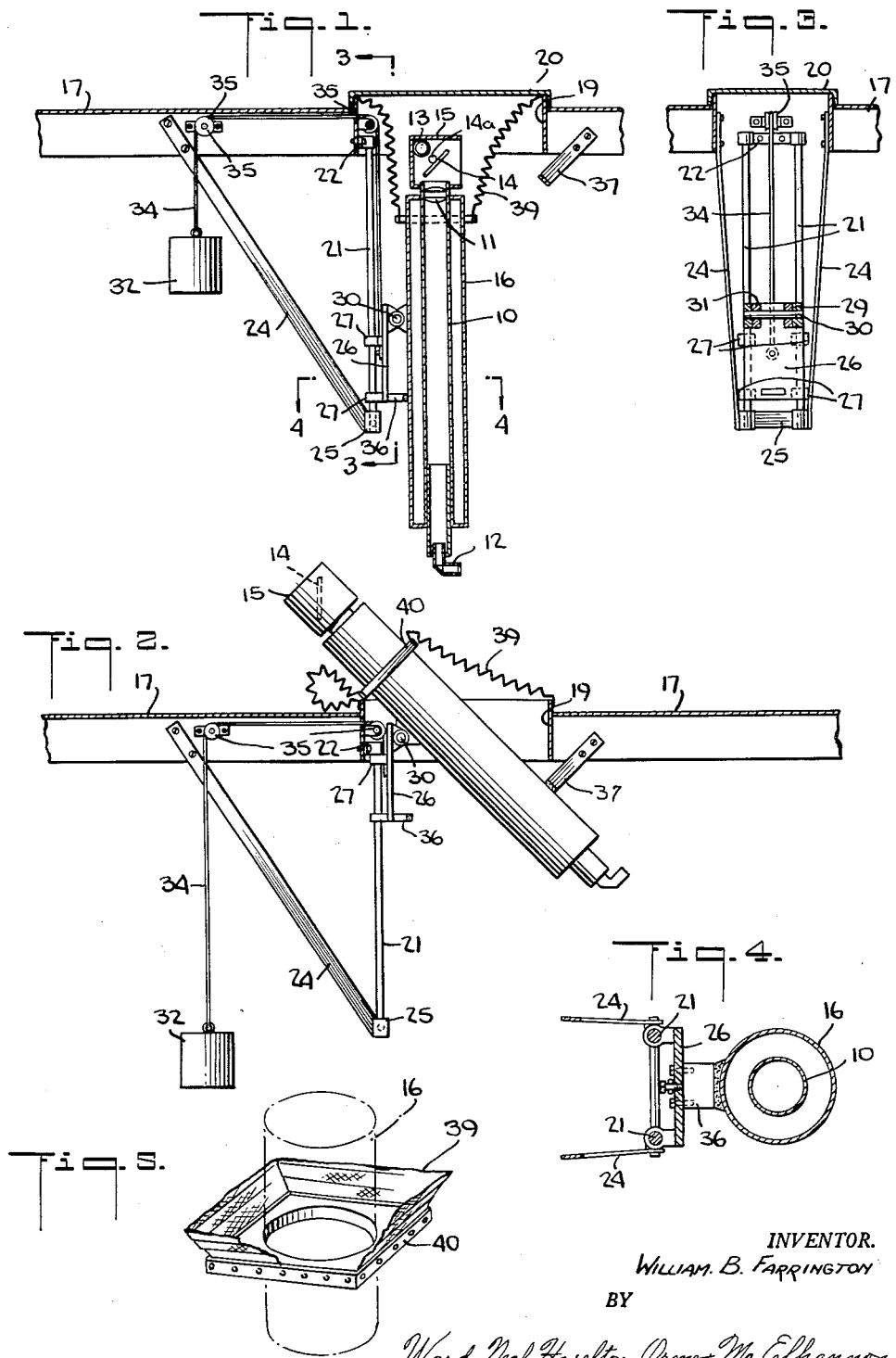

This invention relates to astronomical telescopes and mounts for such telescopes, and more particularly to a convertible altitude-azimuth, right ascension-declination mount by which the telescope is movable between active and inactive positions relatively to a protective partition.

Heretofore, in the use of relatively small instruments, the entire telescope was frequently carried out of doors necessitating a large fixed support or repeated adjustment; or observations were made through an open hatch which limited the field of view, both methods subjecting the instrument and the observer to exposure to the elements. Furthermore, it will be appreciated that a long telescope is subject to vibration even in a slight breeze unless it is extremely heavy and well braced, and a clock drive for such a telescope must be of considerable power.

I have conceived by my invention an effective solution to the problems presented and have actually constructed a successfully operating and commercially desirable telescope based on that concept.

As a feature of my invention, I provide in a mount for moving a telescope tube from an inactive position at one side of a protective partition to an active position projecting through an opening in the partition, an assembly including a casing carrying the telescope tube for rotary displacement about its central longitudinal axis, elevating means supporting the assembly for linear displacement of the tube to and from active position relatively to the partition, and means supporting the assembly for pivotal movement of the tube to vary the inclination thereof.

In accordance with this feature of the invention, the elevating means may include a carriage and slide means for controlling movement of the carriage, and abutment means are provided for limiting the linear displacement of the tube from its inactive position. The casing and tube assembly are supported on the carriage by a pivot connection so that the assembly moves with the carriage but may be pivoted to various inclined dispositions about the pivot axis which is preferably horizontal. The slide may be in a plane parallel to the zenith line of the tube so that teh carriage moves in such a plane; and a counterweight is provided to counterbalance the assembly in any of its positions.

As a further feature of the invention, means are provided for maintaining the tube with its longitudinal axis in the line of its zenith while in any of its positions of linear displacement. Such means may conveniently comprise a stop supported on the carriage but somewhat spaced from the pivot means and against which a part of the assembly may bear to maintain proper zenith alignment. In this way, by utilizing an adjustable optical flat ahead of the main objective lens, proper alti-azimuth orientation is assured when the flat is disposed in a selected position. Additionally, the tube may readily be tilted about its pivot axis to assume a right ascension-declination position.

Another feature of the invention resides in the provision of a second stop or abutment against which the assembly may be brought to bear by tilting about the aforementioned pivot axis. This stop may be so arranged as automatically to orient the longitudinal axis of the tube in a position parallel to the axis of rotation of the earth.

Additionally, the present concept contemplates protection of the observer and the operating elements of the mount by means of a flexible boot connected between the casing and tube assembly and the partition to close that area of the opening in the partition adjacent the assembly when the tube is in active position.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 1 is a vertical cross-sectional view illustrating the positions of the telescope and the elements of its mount in relation to a protective partition, the telescope being in inactive position;

FIG. 2 is a view similar to FIG. 1, but shows the telescope in active, inclined position;

FIG. 3 is a cross-sectional view taken along the line 3—3 of FIG. 1;

FIG. 4 is a cross-sectional view taken along the line 4—4 of FIG. 1; and

FIG. 5 is a fragmentary perspective view illustrating one manner of connecting the boot to the casing, the latter being shown in phantom.

Referring now to the drawings, and more particularly to FIGS. 1 and 2 thereof, there is shown a telescope tube 10 having an objective lens 11 at one end and a ninety degree eyepiece 12 at the other. A motor 13 for rotating an optical flat 14 about a pivot 14a is conveniently mounted along with the flat in a suitable housing 15 at the upper end of the tube 10 and ahead of the objective lens. A substantial portion of the tube is enveloped in a cylindrical casing 16 which supports the tube for rotary displacement about its longitudinal axis.

The telescope is suspended from a protective partition 17, such as a roof, which has an opening or hatch 19 fitted with a removable cover 20. As shown in FIGS. 1 to 4, suspension is effected by means of a pair of spaced, vertically disposed bars 21 secured at their upper ends to the partition 17 by means of a suitable bracket 22. Inclined braces 24 extend between points on the partition spaced from the bracket 22, and the lower ends of the bars 21 to which they are secured by a bracket 25.

Actually, the bars 21 also serve as a vertical slide for a carriage 26 equipped with a pair of vertically spaced loops or guide rings 27 slidably embracing each of the bars 21. The carriage 26 is essentially a flat plate and is provided at its upper end with a pair of bearings 29 for a horizontal pivot shaft 30. The casing 16 is equipped with similar bearings 31 from which it will be seen that the casing and tube 10 may pivot about the longitudinal axis of the shaft 30. It will also be appreciated that the tube and casing assembly will be raised with the carriage 26 from its inactive position below the closed hatch (FIG. 1), to active position projecting through the hatch (FIG. 2). The movement of the assembly to active position is limited by the bracket 22 at the upper end of the bar 21 which serves as a stop for the upper guide rings 27 on the carriage 26.

A counterweight 32 is attached by a cable 34 and a pair of pulleys 35 to the carriage 26 to counterbalance the telescope in any position of the carriage 26 relatively to the bars 21.

As has been stated, it is preferred that the telescope tube be linearly displaceable along the line of its zenith so that upon shifting it linearly from inactive to active position, without tilting it as shown in FIG. 2, the telescope will be in position for alti-azimuth use. With this purpose in mind, the bars 21 are mounted in a plane parallel to the zenith line of the tube and means are provided for maintaining the longitudinal axis of the tube coincident wtih its zenith line in any of its positions of linear displacement. Such means may conveniently take the form of an adjustable stop 36 mounted in the lower part of the carriage 26 for movement therewith. When the tube and casing assembly are in contact with the stop 36, the tube axis automatically coincides with the line of its zenith.

Referring now more particularly to FIG. 2, the telescope is shown in active or elevated position, and inclined relatively to its zenith about the pivot shaft 30. As has been stated, means are provided for orienting the longitudinal axis of the tube 10 in parallel with the earth's axis. Such means may comprise the abutment or stop 37 which may conveniently be affixed to the partition, for example. The stop 37 is so located as to provide a limit stop for the tube and casing assembly when they are tilted about the pivot shaft 30, bringing the same to rest in the desired orientation.

As has already been stated, a motor 13 is provided for rotating the flat 14 about the pivot 14a. The flat may therefore be utilized to supply a variation in altitude while the axis of the telescope is coincident with the line of its zenith, or to vary the declination when the axis of the telescope has been pivoted to a position parallel to the earth's axis (FIG. 2). By setting the flat in a selected position, and the axis of the telescope coincident with its zenith, it will be seen that proper alti-azimuth orientation is assured.

As shown in FIGS. 1, 2 and 5 a flexible boot 39 formed of focusing cloth, darkened polyethylene film or the like, is attached to the partition 17 along the edge of the hatch 19 and to the casing 16 by means of a frame 40 fitted around the casing near the upper end thereof. Such a boot in no way interferes with the movement of the instrument and serves to protect the observer and the structure mounting elements from the effects of the elements. Additionally, the boot prevents light from passing through the hatch and thus facilitates photography through the telescope, particularly in the daytime.

From the foregoing description it will be seen that I have contributed to the art a fixed mount that makes possible proper alti-azimuth or right-ascension declination orientation of a telescope, as well as conversion from one position to the other with great facility and without loss of stability. It will also be seen that the present mount maintains the sight instrument substantially free of vibration. In this connection, it will be noted that the major portion of the instrument remains beneath the partition at all times thus effectively reducing vibration due to wind.

Those persons skilled in the art will appreciate that the observer is always in a comfortable position for viewing and that if desired, a relatively small clock drive can be employed since the right-ascension motion involves only rotation of the tube about its own axis.

I believe that the construction and operation of my novel telescope mount will now be understood, and that the advantages of my invention will be fully appreciated by those persons skilled in the art.

I now claim:

1. In a telescope mount of the class described for moving a telescope tube from an inactive position at one side of a protective partition to an active position projecting through an opening in said partition, an assembly including a casing carrying said telescope tube for rotary displacement about its central longitudinl axis, elevating means supporting said assembly for linear displacement of said tube to and from active position relatively to said partition, and means supporting said assembly for pivotal movement of said tube to vary the inclination thereof.

2. In a telescope mount of the class described for moving a telescope tube from an inactive position at one side of a protective partition to an active position projecting through an opening in said partition, an assembly including a casing carrying said telescope tube for rotary displacement about its central longitudinal axis, elevating means supporting said assembly for linear displacement of said tube to and from active position relatively to said partition, means supporting said assembly for pivotal movement of said tube to vary the inclination thereof, and means for aligning said tube with its longitudinal axis in the line of its zenith while in any of its positions of linear displacement.

3. In a telescope mount of the class described for moving a telescope tube from an inactive position at one side of a protective partition to an active position projecting through said partition, an assembly including a casing carrying said telescope tube for rotary displacement about its central longitudinal axis, elevating means supporting said assembly for linear displacement of said tube to and from active position relatively to said partition, means supporting said assembly relatively to said elevating means for pivotal movement of said tube, and stop means for maintaining said tube at a selected inclination.

4. A telescope mount according to claim 3, wherein said stop means is arranged to maintain said tube at an inclination wherein its central longitudinal axis is parallel to the axis of rotation of the earth.

5. In a telescope mount of the class described for moving a telescope tube from an inactive position at one side of a protective partition to an active position projecting through an opening in said partition, an assembly including a casing carrying said telescope tube for rotary displacement about its central longitudinal axis, elevating means supporting said assembly for linear displacement of said tube to and from active position relatively to said partition, said elevating means including a carriage and slide means for controlling movement of said carriage, means carried by said carriage and supporting said assembly for pivotal movement of said tube relatively to said carriage, and abutment means limiting the linear displacement of said carriage in a direction to bring said tube to active position.

6. In a telescope mount of the class described for moving a telescope tube from an inactive position at one side of a protective partition to an active position projecting through an opening in said partition, an assembly including a casing carrying said telescope tube for rotary displacement about its central longitudinal axis, elevating means supporting said assembly for linear displacement of said tube to and from active position relatively to said partition, said elevating means including a carriage and slide means for controlling movement of said carriage, means carried by said carriage and supporting said assembly for pivotal movement of said tube relatively to said carriage, abutment means limiting the linear displacement of said carriage in a direction to bring said tube to active position and a counterweight arranged relatively to said carriage to maintain said tube in any of its positions of linear displacement.

7. In a telescope mount of the class described for moving a telescope tube from an inactive position at one side of a protective partition to an active position projecting through an opening in said partition, an assembly including a casing carrying said telescope tube for rotary displacement about its central longitudinal axis, elevating means supporting said assembly for linear displacement of said tube to and from active position relatively to said partition, means supporting said assembly for pivotal movement of said tube, and a flexible boot connected between said assembly and said partition to close the area of the opening in said partition adjacent said assembly when said tube is in active position.

8. In a telescope mount of the class described for moving a telescope tube from an inactive position at one side of a protective partition to an active position projecting through an opening in said partition, an assembly including a casing carrying said telescope tube for rotary displacement about its central longitudinal axis, elevating means supporting said assembly for linear displacement of said tube to and from active position relatively to said partition, means supporting said assembly for pivotal movement of said tube to vary the inclination thereof, stop means for aligning said tube at a selected inclination, and means for aligning said tube with its longitudinal axis in the line of its zenith while in any of its positions of linear displacement and a flexible boot connected between said assembly and said partition to close the area of the opening adjacent said assembly when said tube is in active position.

9. In a telescope mount of the class described for moving a telescope tube from an inactive position at one side of a protective partition to an active position projecting through an opening in said partition, an assembly including a casing carrying said telescope tube for rotary displacement about its central longitudinal axis and an optical flat supported for pivotal movement adjacent one end of said tube, elevating means supporting said assembly for linear displacement of said tube to and from active positions relatively to said partition, means for aligning said tube with its longitudinal axis in the line of its zenith while in any of its positions of linear displacement, means supporting said assembly for pivotal movement of said tube to vary the inclination thereof, and means pivoting said flat to provide a variation in altitude while the axis of said tube is coincident with its zenith and to vary the declination when the axis of the tube is inclined to its zenith.

References Cited in the file of this patent

UNITED STATES PATENTS

| | | |
|---|---|---|
| 1,161,995 | Styll | Nov. 30, 1915 |
| 1,429,981 | Taylor et al. | Sept. 26, 1922 |
| 2,569,010 | Kuzmetz | Sept. 25, 1951 |

FOREIGN PATENTS

| | | |
|---|---|---|
| 736,730 | Germany | June 25, 1943 |